United States Patent

Deeter

[15] 3,688,847
[45] Sept. 5, 1972

[54] MOUNTING FRAME ASSEMBLY FOR ALL TERRAIN VEHICLE

[72] Inventor: Paul E. Deeter, Box 117, Cooperstown, Pa. 16317

[22] Filed: Feb. 3, 1971

[21] Appl. No.: 112,317

[52] U.S. Cl. .................... 172/804, 172/808, 37/41, 280/150 F
[51] Int. Cl. ........................... E02f 3/76, E01h 5/06
[58] Field of Search ............. 37/41, 42 R, 42 VL, 50; 172/272–277, 800–808, 297; 280/150 F, 106, 2

[56] References Cited

UNITED STATES PATENTS

| | | |
|---|---|---|
| 1,964,360 | 6/1934 | Letourneau ............... 37/50 X |
| 2,839,848 | 6/1958 | Mackey ..................... 172/803 |
| 2,883,776 | 4/1959 | Orscheln ................. 172/273 X |
| 2,979,839 | 4/1961 | Hugger .................. 172/272 X |
| 3,226,860 | 1/1966 | McGee ................... 172/276 X |
| 3,487,884 | 1/1970 | Volberding ............... 172/803 |
| 3,605,906 | 9/1971 | Coates ...................... 172/272 |
| 3,246,406 | 4/1966 | Ray, Jr. ..................... 172/804 |

*Primary Examiner*—Robert E. Pulfrey
*Assistant Examiner*—Eugene H. Eickolt
*Attorney*—Howard E. Sandler

[57] ABSTRACT

A mounting frame assembly for an All Terrain Vehicle and more particularly a mounting frame assembly for mounting an implement such as a plow assembly or lawn mower adjacent the forward end of an All Terrain Vehicle.

All Terrain Vehicles, hereinafter referred to as ATV's are relatively new means of transportation and have found public acceptance in recent years because of the capability thereof to travel over swamps, mud, water, sand, snow and extremely rough terrain. The ATV's are water tight and are driven by a plurality of soft low air pressure tires or a pair of endless crawler treads. The tires or treads provide the ATV's with excellent traction and additionally provide means for maneuvering the ATV by a skid steer method; that is, by braking on one side and applying power to the opposite side of the ATV.

The traction capacities of the ATV's coupled with the above described steering arrangement thereof would appear to provide excellent possibilities for such vehicles in the areas of snow clearance, lawn mowing, lawn rolling, and the like; however, all thoughts in such areas were soon discounted because the ATV's, out of necessity of water tightness, efficiency and economy, have the main body portions thereof constructed of plastic, fiberglass or other light material. Pushing a snow plow or lawn mower assembly from the forward end of the body would result in damage to the body.

10 Claims, 6 Drawing Figures

3,688,847

INVENTOR
PAUL E. DEETER

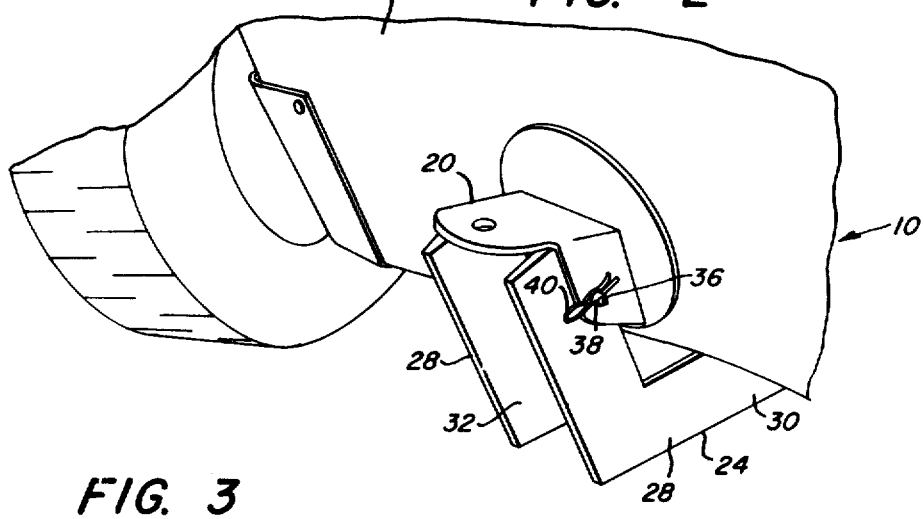
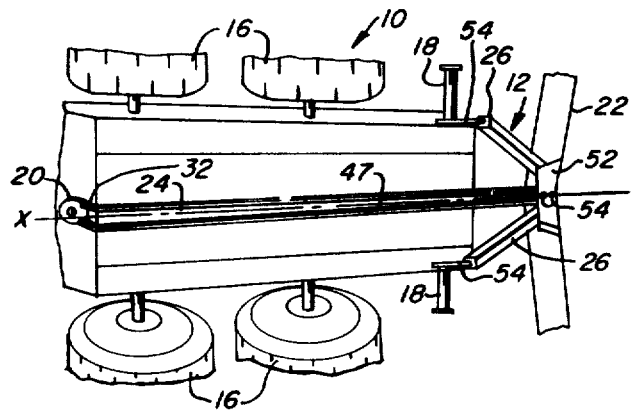
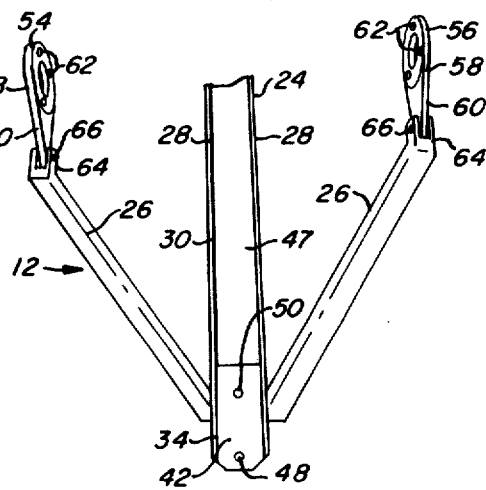
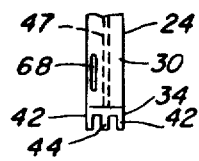
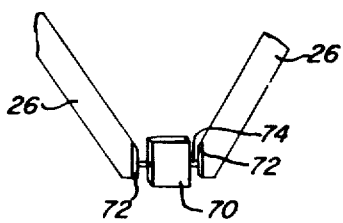
INVENTOR
PAUL E. DEETER
By
Attorney

MOUNTING FRAME ASSEMBLY FOR ALL TERRAIN VEHICLE

By means of the present invention which includes a mounting frame assembly adapted to transfer thrust from a forwardly mounted implement to the rear bearing casing or frame of the ATV, the ATV can have an implement such as a snow plow or lawn mower mounted adjacent the forward end thereof without fear of damage to the ATV body. Still further the mounting frame assembly of the present invention can have the main portions thereof quickly disassembled thereby permitting an ATV to be changed from a primarily working vehicle with somewhat limited maneuverability to a primarily transportation vehicle with full maneuverability in a minimum of time.

These and other objects and advantages of the present invention will become more readily apparent upon a reading of the following details and drawings in which:

FIG. 2 is a partial perspective rear view of the ATV shown in FIG. 1;

FIG. 3 is a partial schematic bottom view of the ATV shown in FIG. 1;

FIG. 4 is a partial plan view of one embodiment of the mounting frame assembly of the present invention; and FIG. 5 is a partial side view of a thrust member of the mounting frame assembly of the present invention.

FIG. 6 is a partial plan view of a centering portion of the mounting frame assembly of the present invention.

FIG. 1 illustrates an ATV (All Terrain Vehicle) generally indicated at 10 and which carries thereon a forwardly extending mounting frame assembly 12 of the present invention. Assembly 12 carries a load device adjacent the forward end thereof and is shown as carrying a snow plow 22 at the forward end thereof.

Figure 1:
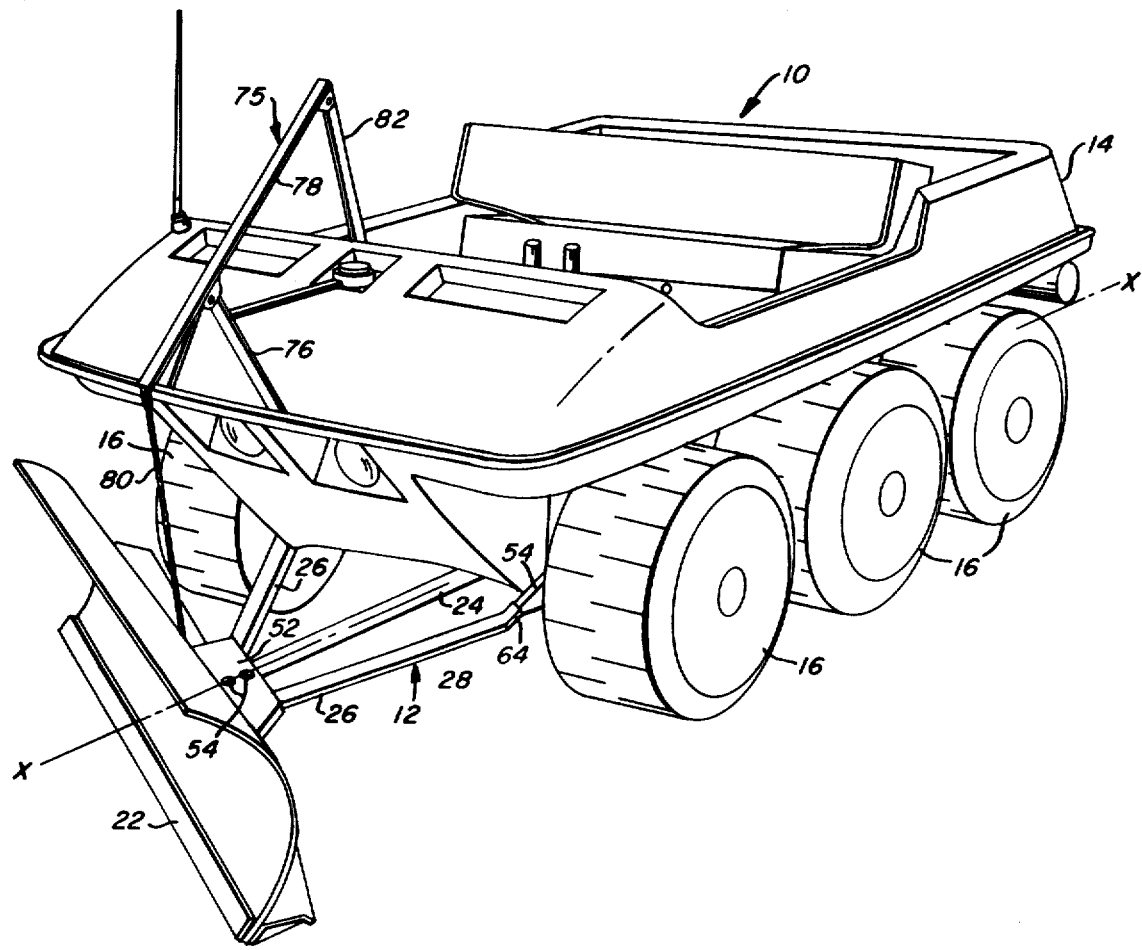
FIG. 1 is a perspective view partially schematic of an ATV carrying a mounting frame assembly of the present invention and with a snow plow carried by such frame assembly at the forward end thereof.

ATV 10 is of any known construction and as shown comprises: a body 14 made of a lightweight impervious material such as plastic or fiberglass and carried by a suitable structural frame (not shown); and a plurality of soft low air pressure tires 16 which drive the ATV 10. Driving torque is supplied to tires 16 by respective independent drive shafts or axles 18 which are suitably rotatably carried by the structural frame. ATV 10 additionally includes a trailer hitch 20 which is carried by the structural frame adjacent the rearward end thereof.

As more fully described hereinafter mounting frame assembly 12 comprises: a thrust boom 24 having the forward end thereof adapted to be secured to a loading device such as plow 22 and having the rearward end thereof secured to hitch 20 to transmit thrust from plow 22 to the ATV structural frame; and centering arms 26 which maintain boom 24 substantially equidistantly spaced from the sides of ATV 10.

Thrust boom 24 is of any suitable cross section and, as shown is a generally H-shaped cross section which, when in position on the ATV 10, extends longitudinally with respect to a longitudinal axis X—X of ATV 10 and has the flanges 28 thereof substantially equally spaced on opposite sides of axis X—X. Thrust boom 24 comprises: an elongated intermediate portion 30; a rear attach portion 32 which is fixedly secured to portion 30 adjacent the rearward end thereof and depends transversely therefrom; and a forward attach portion 34 which is fixedly secured to portion 30 adjacent the forward end thereof. Trailer hitch 20 is of a generally U-shaped configuration and is carried by the ATV structural frame such that the U opens downwardly. The transverse distance intermediate the sides of hitch 20 is essentially equal to or slightly larger than the out to out transverse distance between flanges 28. A single bore extends through each side of the hitch 20. Bores 36 are in coaxial alignment. A single bore (not shown) extends through each flange 28 at an upper portion thereof and such bores 28 are in coaxial alignment.

To attach thrust boom portion 32 to hitch 20 the free end of portion 32 is inserted upwardly in hitch 20 until the coaxial bores through the flange 28 are coaxially aligned with bores 36. After such alignment a pivot pin 38 is inserted through the aligned bores and the pin 38 is retained in the inserted position in any suitable manner, for example, utilizing cotter pins 40 at each axial end thereof. With boom portion 32 secured to hitch 20 as described hereinabove, intermediate boom portion 30 is spaced downwardly from the lower surface of the ATV body 14 and portion 30 extends forwardly from attach portion 32 and has the forwardmost end thereof spaced forwardly from the forwardmost end of ATV 10.

With boom portion 32 attached to hitch 20 as described hereinabove it is to be noted that the rearward portion of thrust boom 24 is restrained from horizontal movement with respect to axis X—X while simultaneously allowing a limited vertical pivoting of boom 24 about the horizontal axis through pivot pin 38.

An additional point to be noted is that mounting frame assembly 12 of this invention is intended to be used with an ATV of the type which has a trailer hitch or provisions for or capabilities to be adapted to carry a trailer hitch on the structural frame adjacent the rearward end thereof. Accordingly it is contemplated to provide a more or less universal trailer hitch to substitute for the original trailer hitch of the ATV or to position at the rearward end of an ATV which is provided without a trailer hitch thereby enabling a standard thrust boom 24 of assembly 12 to be readily secured to any ATV. It is to be further noted that although thrust boom 24 is described hereinabove as being a single unitized member it is contemplated that such member can be extensible, for example, cooperating extensible tubular portions which can be fixed after the extension thereof to the proper length.

The boom forward attach portion 34 is of any suitable configuration and as shown has upper and lower plates 42 peripherally welded to boom portion 30 at a forward end section thereof on the respective upper and lower sides thereof. The forwardmost ends of plates 42 are spaced forwardly from the forwardmost end of portion 32. An intermediate plate 44 has the rearward end thereof secured to the forwardmost end of the web 47 of boom portion 30 and depends forwardly therefrom. A respective bore 48 extends vertically through each plate 42 and 44 adjacent the forward ends thereof. Bores 48 are in vertical coaxial alignment. Rearwardly spaced from bores 48, a respective bore 50 extends vertically through each plate 42 and 44. Bores 50 are in vertical coaxial alignment. Plow 22 has upper and lower attaching plates 52 extending rearwardly from the plow face plate 54 thereof. The forward end of thrust boom 24 is received intermediate plates 52 and thereafter bores 48 and 50 are aligned with respective bores through plates 52. After such alignment pins 54 are inserted through the aligned bores and retained in position in any suitable manner.

Centering arms 26 are shown as having a generally right angle shaped cross section which, when in position on the ATV 10, have the rearward ends thereof secured to ATV adjacent a respective forward axle 18 thereof and extend forwardly and inwardly therefrom to have the forwardmost ends thereof in a spaced relationship to maintain boom 24 therebetween in a position substantially equidistantly spaced from the sides of ATV 10, all in a manner as more fully described hereinafter.

A gusset or side plate 56 is secured to each side of the structural frame of ATV 10 adjacent the forward end thereof. Each side plate 56 comprises an annular disc shaped rearward portion 58 and a side arm attach portion 60 which depends forwardly from portion 58. To secure side plates 56 to ATV 10 the front tires 16 are removed thereby exposing seal plates (not shown) at the sides of body 14 adjacent the forward end thereof. The seal plates are secured to the structural frame such as by bolts and these bolts are removed. A respective side plate 56 is brought into contact with each seal plate and aligned therewith such that the bolt holes through the seal plates are in coaxial alignment with bores 62 through side plate portion 58. Bolts are then threaded through bores 62, through a respective seal plate and into the ATV structural frame thus retaining side plates 56 in position such that a respective axle 18 extends freely therethrough and side plate portion 60 extends forwardly of body 14. After side plates 56 are in position as discussed hereinabove tires 16 are remounted on the respective axles 18 thereof.

Each centering arm 26 has a skewed biforcated end portion 64 fixedly secured thereto along one angle leg thereof. A coaxially aligned bore extends through each biforcation and the distance between each biforcation is slightly greater than the thickness of side plate portion 60. Centering arms 26 are aligned such that a respective plate portion is at least partially received intermediate the biforcations of end portion 64 and a bore transversely through plate portion 60 is coaxially aligned with the bores through each biforcation. After such alignment a pivot pin 66 is inserted through the aligned bores and retained in the inserted position in any suitable manner. Inasmuch as end portion 64 is angled inwardly at the forward end thereof, centering arms 26 extend forwardly and inwardly therefrom.

With centering arms 26 attached to side plates 56 as described hereinabove it is to be noted that the rearward portion of arms 26 are restrained from horizontal movement with respect to axis X—X while simultaneously allowing a limited vertical pivoting of arms 26 about the horizontal axis through the respective pivot pins 66. As shown, the axes through pivot pins 66 on opposite sides of ATV 10 are in substantially coaxial alignment.

A slot 68 extends through each flange 28 intermediate bores 48 and 50. The slots 68 through respective flange 28 are in substantially coaxial alignment and are positioned through flanges 28 intermediate the upper plate 42 and the web 47. A slide plate 70 having a width thereof less than the distance between the flanges 28 is slidably carried by thrust boom 24 intermediate the flanges 28, the upper plate 42 and the web 47. A bore extends transversely through plate 70.

The forward end of centering arm 26 is skewed and a plate 72 is fixedly secured thereto. When centering arms 26 are in position as described hereinabove the plates 72 thereof extend generally parallel to axis X—X and a bore through each plate 72 is aligned with a respective slot 68. After such alignment a pin 74 is inserted through the aligned bores through plates 72, through the bore through slide plate 70 and through the slots 68. Pin 74 is retained in the inserted position thereof in any suitable manner.

With the forward end of thrust boom 24 secured between centering arms 26 as described hereinabove, boom 24 is restrained from horizontal movement with respect to axis X—X while simultaneously allowing a limited vertical pivoting of boom 24, about the horizontal axis through pivot pin 38. When such pivoting of boom 24 occurs centering arms 26 will pivot about the horizontal axis through the respective pivot pins 66 thereof and pin 74 will slide within slots 68. Slide plate 70 serves to maintain pin 74 in a generally perpendicular position with respect to flanges 28 by moving with pin 74 and sliding on web 47.

With a mounting frame assembly 12 constructed as described hereinabove ATV 10 can carry plow 22 adjacent the forward end thereof and have any thrust applied to plow 22 transferred to the thrust boom 24. Boom 24 carries such force to the structural frame of ATV 10 adjacent the rearward end thereof by means of the connection at trailer hitch 20. The thrust force will be dissipated entirely by the structural frame of the ATV 10 and will not react on the body 14.

To detach an assembly 12 which is carried by an ATV 10 one merely has to remove the pivot pins 38 and 66 and the assembly will drop free. Sides plates 56 and hitch 20 will remain on ATV 10 upon the removal of the pivot pins, however, such elements will not effect the maneuverability or efficiency of the ATV 10.

As hereinbefore described mounting frame assembly 24 is provided with a limited vertical movement for purposes of maneuverability and riding over obstructions and the like. In order to have a control over such vertical maneuverability a manual lifting apparatus can be provided. FIG. 1 illustrates such a manual lifting apparatus 75 wherein an upwardly extending A-frame 76 is carried by the structural frame adjacent the forward end thereof. A lever arm 78 is pivotally secured to A-frame 76 intermediate the axial ends thereof. The forward end of lever arm 78 has a chain 80 secured thereto and the rearward end thereof has a vertically extending bar 82 pivotally secured thereto. The lowermost end of chain 80 is secured to plow 22. The bar 82 has a handle (not shown) adjacent the lower end thereof. With a lifting apparatus as described hereinabove the operator of the ATV 10 applies a downward force on bar 82 to lift the plow 22 and mounting frame assembly 12.

Inasmuch as the invention herein resides in the mounting frame assembly which allows the mounting of an implement adjacent the forward end of an all terrain vehicle various modifications can be made to the embodiment described hereinabove without departing from the scope of the invention as defined by the scope of the claims set forth hereinafter.

What is claimed is:

1. A frame assembly for mounting an implement in front of a longitudinally extending all terrain vehicle of a type having a light body carried by a structural frame comprising: an elongated thrust member; first means for pivotally attaching a rear end portion of said thrust member to said structural frame adjacent the rear end thereof for limited vertical movement about the pivot axis thereof; said thrust member extending longitudinally of said all terrain vehicle intermediate the sides thereof and being spaced below the body portion thereof; said thrust member having a forward end portion thereof spaced forwardly of said all terrain vehicle and adapted to be secured to said implement; a pair of centering arms each of which are adapted to have a rear end portion thereof carried by said all terrain vehicle adjacent a respective side thereof; a pair of second means each of which pivotally attach the rear end portion of a respective centering arm to said structural frame adjacent the forward end thereof for limited vertical movement about the respective pivot axis thereof; said centering arms extending forwardly and inwardly from the respective second means and a forward portion of said thrust member being disposed intermediate said centering arms; and third means communicating between said centering arms and said thrust member maintaining said thrust member intermediate said sides of said all terrain vehicle while simultaneously allowing a limited vertical movement of said thrust member.

2. A frame assembly as specified in claim 1 wherein said implement mounted in front of said all terrain vehicle is a snow plow assembly.

3. A frame assembly as specified in claim 2 additionally including lift means carried by said structural frame for lifting said snow plow assembly and said frame assembly through a limited vertical movement.

4. A frame assembly as specified in claim 1 wherein said longitudinal extent of said thrust member is spaced substantially equidistant from the sides of said all terrain vehicle.

5. A frame assembly as specified in claim 4 wherein said third means maintain said longitudinal extent of said thrust member substantially equidistant from the sides of said all terrain vehicle.

6. A frame assembly as specified in claim 1 wherein said first means includes a trailer hitch carried by said structural frame adjacent the rear end thereof.

7. A frame assembly as specified in claim 1 wherein said all terrain vehicle includes a plurality of ground engaging wheels each of which are driven from a respective axle extending outwardly from the sides of said body.

8. A frame assembly as specified in claim 8 wherein each of said second means includes a forwardly extending side plate having a rear portion thereof secured to a respective side of said structural frame adjacent the forward end thereof and said rear portion being adapted to have a respective forward axle extend laterally therethrough.

9. A frame assembly as specified in claim 1 wherein the respective pivot axis of said second means are in substantially coaxial alignment.

10. A frame assembly as specified in claim 1 wherein said first and second means substantially retain the rearward ends of said thrust member and said centering arms, respectively, from horizontal movement with respect to said structural frame.

* * * * *